United States Patent
Cabourdin et al.

(10) Patent No.: US 9,061,231 B2
(45) Date of Patent: *Jun. 23, 2015

(54) PURIFICATION ARRANGEMENTS AND METHODS FOR GAS PIPELINE SYSTEMS

(71) Applicant: Pall Corporation, Port Washington, NY (US)

(72) Inventors: Jean-Pierre Cabourdin, Le Vaudreuil (FR); Olivier Trifilieff, Viroflay (FR); Pierre Blanc, Montseveroux (FR); Joseph Samaha, Dubai (AE)

(73) Assignee: Pall Corporation, Port Washington, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/676,282

(22) Filed: Nov. 14, 2012

(65) Prior Publication Data

US 2014/0130672 A1     May 15, 2014

(51) Int. Cl.
  *B01D 45/00* (2006.01)
  *B01D 45/12* (2006.01)
  *B01D 46/00* (2006.01)
  *B01D 50/00* (2006.01)
  *B01D 46/24* (2006.01)

(52) U.S. Cl.
  CPC ............ *B01D 45/12* (2013.01); *B01D 46/0012* (2013.01); *B01D 46/0058* (2013.01); *B01D 46/0091* (2013.01); *B01D 50/002* (2013.01); *B01D 46/2407* (2013.01)

(58) Field of Classification Search
  CPC .. B01D 45/12; B01D 50/002; B01D 46/2407; B01D 46/0058; B01D 46/0091; B01D 46/0012
  USPC .......... 55/318, 319, 320, 323, 324, 346, 337, 55/347, 348, 466; 95/268
  See application file for complete search history.

(56) References Cited

U.S. PATENT DOCUMENTS

| | | |
|---|---|---|
| 2,710,071 A | 6/1955 | Kinser et al. |
| 3,646,730 A | 3/1972 | Reid |
| 3,888,644 A | 6/1975 | Holland et al. |
| 4,297,116 A | 10/1981 | Cusick |

(Continued)

FOREIGN PATENT DOCUMENTS

| | | |
|---|---|---|
| DE | 18 79 283 U | 9/1963 |
| EP | 2 471 588 A1 | 7/2012 |

(Continued)

OTHER PUBLICATIONS

Trifilieff, "Black Powder Removal from Transmission Pipeline: Diagnostics and Solutions," Scientific & Technical Report, 12 pgs, Jan. 19-21, 2009.

*Primary Examiner* — Dung H Bui
(74) *Attorney, Agent, or Firm* — Leydig, Voit & Mayer

(57) ABSTRACT

A purification arrangement for a gas pipeline system includes a pressure vessel and at least first and second purification assemblies in the interior of the pressure vessel. A gas flow may be established through the pressure vessel, and the gas may pass through the first purification assembly and the second purification assembly to remove liquid and/or solid particulates from the gas. At least one of the first and second purification assemblies includes a separator assembly having one or more separators which removes particulates and a shell mounted to one or more of the separators to collect and contain the removed particulates.

23 Claims, 6 Drawing Sheets

(56) References Cited

U.S. PATENT DOCUMENTS

| | | |
|---|---|---|
| RE31,966 E * | 8/1985 | Sillers, Jr. .................... 210/238 |
| 5,078,760 A * | 1/1992 | Haldipur et al. ................ 95/268 |
| 5,358,552 A | 10/1994 | Seibert et al. |
| 5,437,788 A | 8/1995 | Geibel et al. |
| 5,919,284 A | 7/1999 | Perry, Jr. et al. |
| 6,036,751 A | 3/2000 | Ribardi et al. |
| 6,168,647 B1 | 1/2001 | Perry, Jr. et al. |
| 7,270,690 B1 | 9/2007 | Sindel |
| 7,833,298 B2 * | 11/2010 | Larnholm et al. .............. 55/337 |
| 2003/0150324 A1 * | 8/2003 | West ................................ 95/268 |
| 2007/0125048 A1 | 6/2007 | Hunsinger et al. |

FOREIGN PATENT DOCUMENTS

| | | |
|---|---|---|
| FR | 2 311 574 A1 | 12/1976 |
| GB | 1 537 863 A | 1/1979 |

\* cited by examiner

PURIFICATION ARRANGEMENTS AND METHODS FOR GAS PIPELINE SYSTEMS

DISCLOSURE OF THE INVENTION

Natural gas and other gases transmitted through pipeline systems may carry many types of particulates, including liquid droplets and/or solid particles. The gas may be the source of the particulates. For example, gas entering the pipeline system from a gas treatment facility after it has been extracted from a well may still be laden with particulates. Or the particulates may be generated within the pipeline system itself. For example, solid particles may be generated by corrosion and abrasion within the pipeline system. Liquid droplets may arise from condensation or as residues of liquid cleaners for the pipeline system. Many of these particulates are harmful to the components of the pipeline system and the personnel who operate and service the pipeline system. For example, the gas may carry black powder, a general term used to describe a host corrosion-related particulate contaminants, that can be erosive, toxic, and/or chemically reactive with air, i. e., pyrophoric.

The present invention relates to purification arrangements and methods for removing particulates from gas flowing through the pipeline system. Embodiments of the invention may include a pressure vessel having an inlet and an outlet connected to the pipeline system. The pressure vessel may contain at least two purification assemblies, and the gas may be directed through the pressure vessel, where the purification assemblies remove particulates from the gas.

A wide variety of purification assemblies may be used to remove the particulates. For example, one or more of the purification assemblies may comprise a filter assembly. Each filter assembly may include one or more filter elements, and each filter element may include a porous filter medium. As the gas flows through the pressure vessel, it passes through the filter medium, and the particulates carried by the gas are trapped on the surface of and/or within the filter medium. Further, at least one of the purification assemblies comprises a separator assembly. Each separator assembly may include one or more separators which remove particulates from the gas without the use of a porous filter medium. For example, a separator may slow the velocity of the gas and allow the particulates to settle from the gas, or a separator may deflect the particulates from the principal gas flow stream, causing the gas and the particulates to separate from one another. In any event, the purification assemblies remove a significant portion of the particulates, and gas leaving the pressure vessel has significantly fewer particulates than gas entering the pressure vessel.

SUMMARY OF THE INVENTION

In accordance with one aspect of the invention, purification arrangements for a gas pipeline system may comprise a pressure vessel and at least first and second purification assemblies. The pressure vessel may include an interior, a gas inlet, and a gas outlet and may define a gas flow path through the interior of the pressure vessel between the gas inlet and the gas outlet. Both the first and second purification assemblies may be located in the gas flow path in the interior of the pressure vessel between the gas inlet and the gas outlet. The second purification assembly may be positioned in the interior of the pressure vessel between the first purification assembly and the gas outlet. At least one of the first and second purification assemblies includes separator assembly, and the separator assembly has one or more separators which remove particulates from the gas. The separator further includes a shell mounted to one or more of the separators to contain the particulates removed by the separator.

In accordance with another aspect of the invention, purification arrangements for a gas pipeline may comprise a pressure vessel, a filter assembly and a separator assembly. The pressure vessel may include an interior, a gas inlet, and a gas outlet and may define a gas flow path through the interior of the pressure vessel between the gas inlet and the gas outlet. The filter assembly, which may be located in the gas flow path in the interior of the pressure vessel, may comprise a plurality of filter elements, and each filter element may have a porous filter medium. The filter medium filters particulates from the gas flowing through each filter element. The separator assembly may be located in the gas flow path in the interior of the pressure vessel between the filter assembly and the gas inlet of the pressure vessel. The separator assembly may include one or more separators, and each separator removes particulates from gas flowing through the separator assembly. The separator assembly further includes a shell mounted to one or more of the separators to contain the particulates removed by the separator.

In accordance with another aspect of the invention, methods for removing particulates from a gas flowing in a gas pipeline system may comprise establishing a flow of gas through a pressure vessel, including directing the gas through a first purification assembly and a second purification assembly in the interior of the pressure vessel to remove particulates from the gas. Directing the gas through the first and second purification assemblies includes directing the gas through one or more separators which remove particulates from the gas and containing the particulates removed by the separators in a shell mounted to the separators. Each method also comprises terminating the flow of gas through the pressure vessel and servicing at least one of the first and second purification assemblies, including removing from the pressure vessel the separator assembly and the shell containing the particulates.

Purification arrangements and methods embodying one or more aspects of the invention have many advantages. The first and second purification assemblies are highly effective for removing particulates from the gas, so the gas returning to the pipeline system from the pressure vessel has far fewer particulates, e.g., may be largely free of solid particles and liquid droplets, compared to the gas entering the pressure vessel. Further, the purification assemblies may be adjusted or restructured to accommodate varying gas flow conditions in the pipeline without modification of the pressure vessel. In addition, with the shell mounted to one or more of the separators, the purification assemblies may be serviced, e.g., cleaned and/or replaced, much more quickly and safely. For example, by containing the particulates within the shell, the separation assembly may be removed from the pressure vessel without exposing the service personnel to the potentially toxic, even chemically reactive, particulate matter removed from the gas by the separators. For some embodiments, the shell may be liquid-tight and may be filled with water and/or any other suitable inhibitor before removal, further protecting the service personnel by preventing the particulates from contacting the air upon removal. Further, by containing the particulates within the shell, the pressure vessel remains much cleaner, reducing the downtime for servicing and replacing the separator assembly.

DETAILED DESCRIPTION OF EMBODIMENTS OF THE INVENTION

Figure 1:
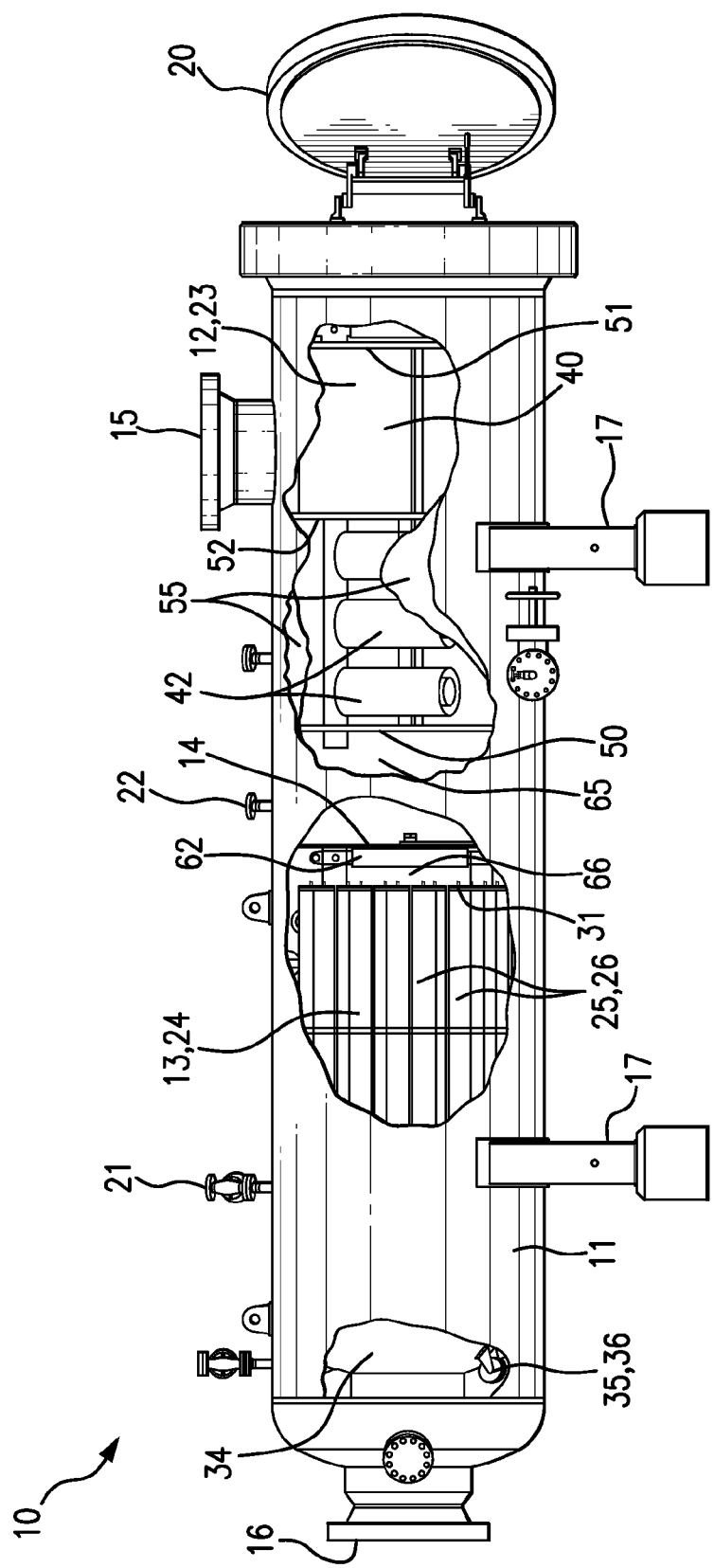
FIG. 1 is a side view of purification arrangement with portions of the pressure vessel and shell cut away.

Purification arrangements embodying the invention may be configured in a wide variety of different ways. For example, the purification arrangement 10 shown in FIG. 1 may comprise a pressure vessel 11 and two or more purification assemblies 12, 13 located in the interior of the pressure vessel 11. The pressure vessel 11 may have a gas inlet 15 and a gas outlet 16 coupled to a gas pipeline system (not shown) and may define a gas flow path through the interior of the pressure vessel between the gas inlet 15 and the gas outlet 16. The purification assemblies 12, 13 are positioned in the gas flow path between the gas inlet 15 and the gas outlet 16. Natural gas or any other gas passing through the gas pipeline system is directed through the pressure vessel 11 from the gas inlet 15 through one of the purification assemblies 12 and then the other purification assembly 13 to the gas outlet 16. A significant portion of the particulates, e.g., almost all solid particles and most of the liquid droplets, entrained in the gas as it enters the gas inlet 15 is removed by the purification assemblies 12, 13, so the gas leaving the pressure vessel 11 is largely free of particulates.

The pressure vessel may be configured in any of numerous ways. For example, the pressure vessel may have a configuration similar to a scraper trap/launcher vessel used to service the interior of the pipeline. The pressure vessel may have an elongate, generally cylindrical structure and the axis may extend horizontally, or it may extend vertically or at any angle between horizontal and vertical. The pressure vessel may be formed as a unitary structure or in a plurality of sections joined together in a fluid-tight manner. Further, the pressure vessel may be constructed to withstand the design pressures and temperatures appropriate for the pipelines of the pipeline system. For example, for many natural gas pipeline systems, the design pressure may be in the range from about 30 barg or less to about 75 barg or more, e.g., about 60 barg, and the design temperature may be in the range from about minus 40° C. to about 100° C., e.g., about 70° C. For many embodiments, the pressure vessel may be formed from a metal and is quite large and heavy. The gas inlet and the gas outlet of the pressure vessel may be on opposite axial ends of the vessel, or one may be on an end and the other may be on the side of the vessel, or both may be on the side of the vessel facing in the same or different directions. In addition to the gas inlet and the gas outlet, a variety of other ports may be provided at various locations on the vessel, including ports for pressure protection, purging, flooding, depressurization, and/or draining and for pressure drop and level control. Further, the pressure vessel may include one or more hatches or other covers on the ends or side of the pressure vessel to allow access to the interior for service personnel and/or equipment, including removal and installation of the purification assemblies. In the embodiment of FIG. 1, the pressure vessel 11 may be oriented horizontally and supported by two or more stands 17 and may include a gas outlet 16 at one end of the pressure vessel 11, a gas inlet 15 in the side of the pressure vessel 11 nearer the other end, e.g., along the top of the pressure vessel 11, and a cover such as a quick opening hatch 20 hinged at the other end of the pressure vessel 11. The hatch 20 may be large enough to swing open and provide access along the entire inner diameter of the pressure vessel 11, facilitating installation and removal of the purification assemblies. Alternatively, a cover may be bolted to the end of the pressure vessel, again providing access along the entire inner diameter when the cover is removed and facilitating removal and installation of one or more of the purification assemblies. The pressure vessel 11 may also be provided with one or more purge gas inlets 21 and one or more gas discharge outlets 22 communicating between the interior and exterior of the pressure vessel 11.

The purification assemblies may be configured in a wide variety of ways to remove particulates, including liquid particulates and/or solid particulates, entrained in the gas. For example, depending on the specific type of particulates present in the gas of the pipeline system, at least one or all of the purification assemblies in the pressure vessel may be a separator assembly and one or more of the purification assemblies in the pressure vessel may be a filter assembly. For many pipeline systems, black powder may be a typical particulate entrained in the gas. Black powder is a general term used to describe a host of corrosion related contaminants in pipelines that transport natural gas, hydrocarbon condensates, liquefied petroleum gas, and other gases. The chemical and physical composition of black powder may vary significantly. It can be a dry powder, a liquid suspension, and/or an intermediate sticky sludge. The dry powder may include iron oxides, iron sulfides, and iron carbonates and may be fine, even submicron in size. For example, about 70% of the dry black powder particles may be about 10 microns or less in size, and the total loading may be in the range of about 5 to 30 grams/MMSCF during normal operation of the pipeline, although after a scraping operation the total loading may increase by a factor of up to 20 or more. Binder material present in the pipelines, e.g., parafins, asphaltenes, glycols, and/or lubricants, may hold some of the black powder particles together to form larger agglomerates. Additional solids, e.g., sand and/or silt, frequently accompany the black powder entrained in the gas. Consequently, for many, but not all, of the embodiments, one of the purification assemblies, e.g., the most downstream purification assembly in the pressure vessel, may be a filter assembly arranged to remove finer particulates, and another purification assembly, e.g., the most upstream purification assembly, may be a separator assembly arranged to remove liquid particulates and/or larger solid particulates and agglomerates. For example, in the purification arrangement 10 shown in FIG. 1, the purification assembly 12 coupled more closely to the gas inlet 15 may be a separator assembly 23 and the purification assembly 13 coupled more closely to the gas outlet 16 may be a filter assembly 24.

Figure 2:
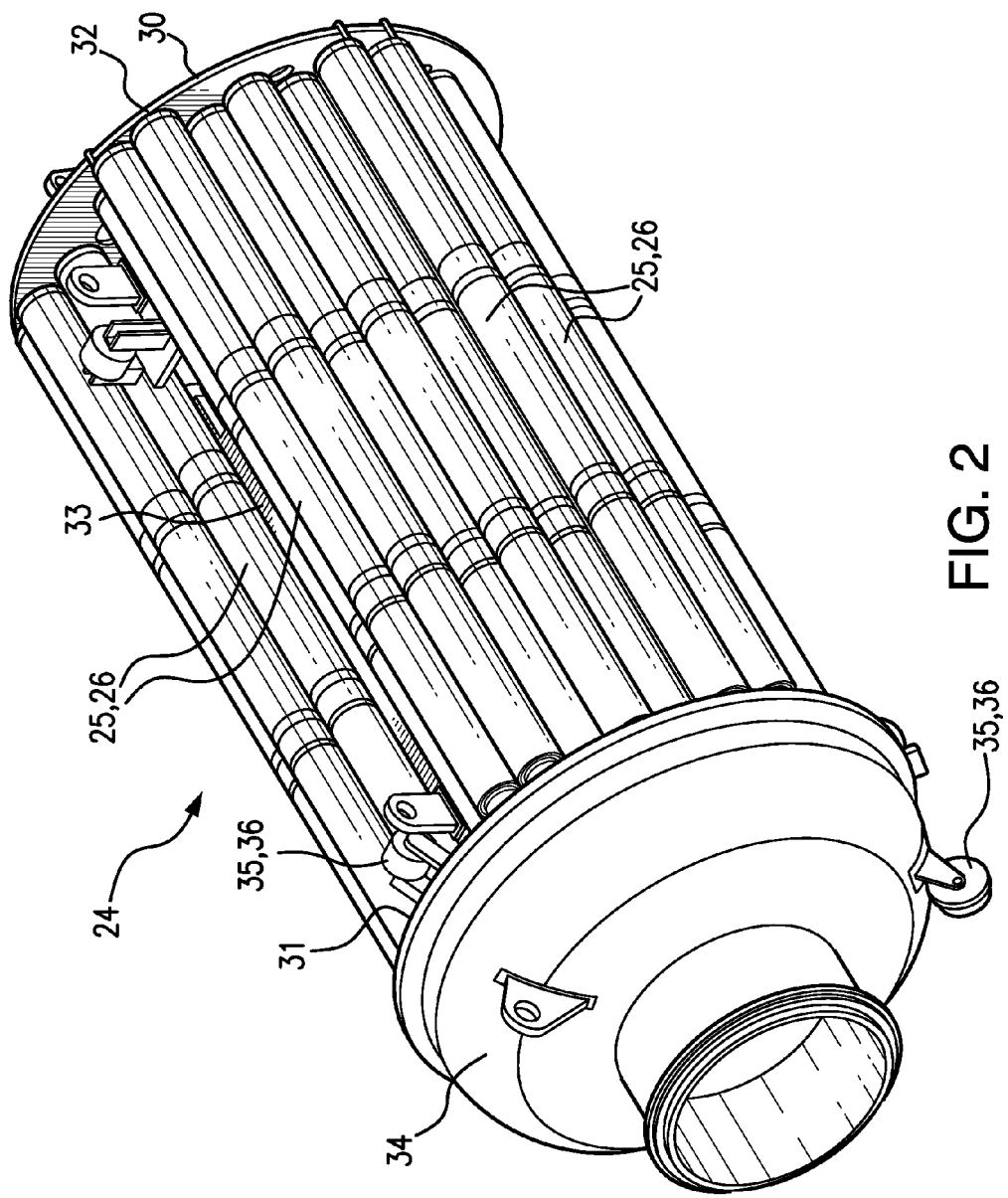
FIG. 2 is an oblique view of a filter assembly.

The filter assembly may be configured in any of numerous ways and may include one or more filter elements. For many embodiments, the filter assembly 24 may comprise a filter bundle assembly having an array of filter elements 25, as shown in FIG. 2. The filter elements may have any of a wide variety of shapes and sizes. For example, each filter element 25 may have a hollow, generally cylindrical shape, may include a blind end and an open end fluidly communicating with the interior of the hollow element, and may be arranged for gas flow outside-in or inside-out through element. The filter elements 25 may include a wide variety of porous filter media 26 for removing particulates from the gas. The porous filter medium may, for example, include a porous metal medium, a porous ceramic medium, or a porous polymeric medium and may, for example, be in the form of a spirally wound or pleated membrane or sheet, e.g., a fibrous sheet, or a hollow, cylindrical mass, e.g., a fibrous mass. Further, the filter medium may have any of a variety of removal ratings. For embodiments targeting black powder, the filter medium may comprise a high-efficiency, high-dirt capacity, tapered-pore, absolute-rated gas depth filter medium. Examples of filter elements that are particularly effective for removing black powder include filter elements rated 0.3 micron in gas and available under the trade designation Coreless from Pall Corporation of Port Washington, N.Y. USA.

The filter assembly 24 may also include a frame 30 for supporting the array of filter elements 25 in the pressure vessel 11. The frame may be configured in any of numerous ways and may support the array for gas flow outside-in or inside-out through the hollow filter elements. For example, the frame 30 may support the array for outside-in gas flow and may include a tube sheet 31 at the end of the array nearer the gas outlet 16, a support plate 32 closer to, or at, the opposite end of the array, and one or more struts 33 that connect the tube sheet 31 and the support plate 32. The tube sheet 31 and the support plate 32 may have a shape that generally conforms to the cross-sectional shape of the interior of the pressure vessel and a dimension, e.g., an outer diameter, that closely corresponds to the inner diameter of the pressure vessel. The tube sheet 31 may have a plurality of openings, and the open end of each filter element 25 may be sealed to an opening in the tube sheet 31, either directly or via a stand-off tube, as shown in FIG. 2. The tube sheet 31 thus defines an unfiltered region of the filter assembly around the filter elements 25 on one side of the tube sheet 31 and a filtrate region on the opposite side of the tube sheet 31. The filtrate side of the tube sheet 31 may be sealed to a header 34 which, in turn, may be sealed to the gas outlet 16 of the pressure vessel 11. For example, the header 34 may taper to an outlet end that may be sealed to the gas outlet 16. Alternatively, the tube sheet may be sealed to the interior of the pressure vessel. The support plate 32, which may be connected to the filter elements 25, for example, at the blind ends of the filter elements 25, may also have a plurality of openings, allowing the unfiltered gas to flow along the exterior of the filter elements 25.

The filter assembly may include one or more additional components. For example, the filter assembly may or may not further include a shell surrounding the array of filter elements and/or a transmit mechanism facilitating the removal and installation of the filter assembly within the pressure vessel. In the embodiment shown in FIG. 2, the filter assembly 24 may not include a shell but may include a transit mechanism 35. The transit mechanism may be configured in any of numerous ways including, for example, as slides on the filter assembly and/or rails along the interior of the pressure vessel. In FIG. 2, the transit mechanism 35 may comprise a plurality of wheels 36, e.g., spring loaded wheels, connected to the frame 30 and/or the header 34 and distributed around the filter assembly 24, allowing the filter assembly 24 to be quickly and conveniently rolled out of and into the interior of the pressure vessel 11.

Figure 3A:
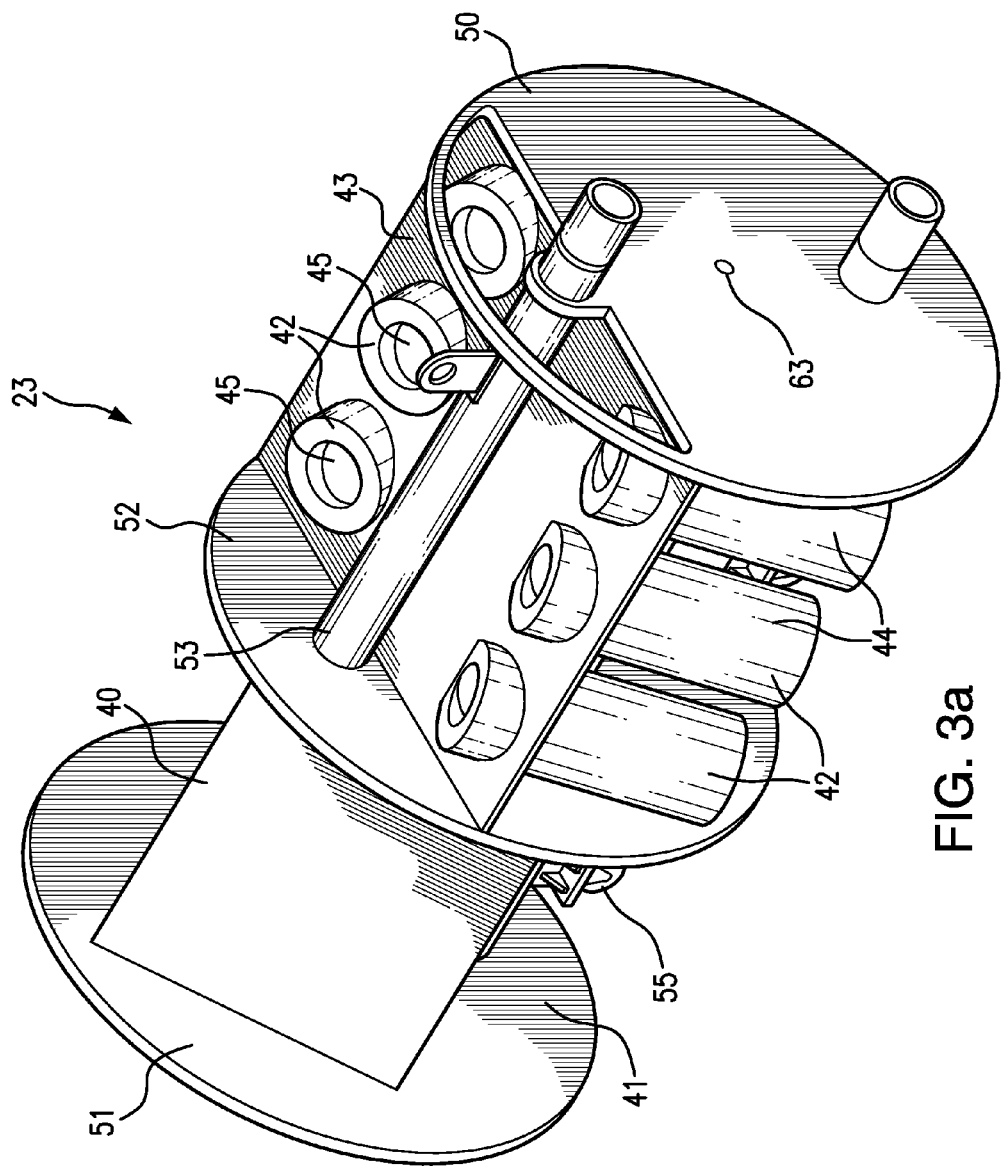
FIGS. 3a and 3b are oblique top and bottom views of a separator assembly.
Figure 3B:
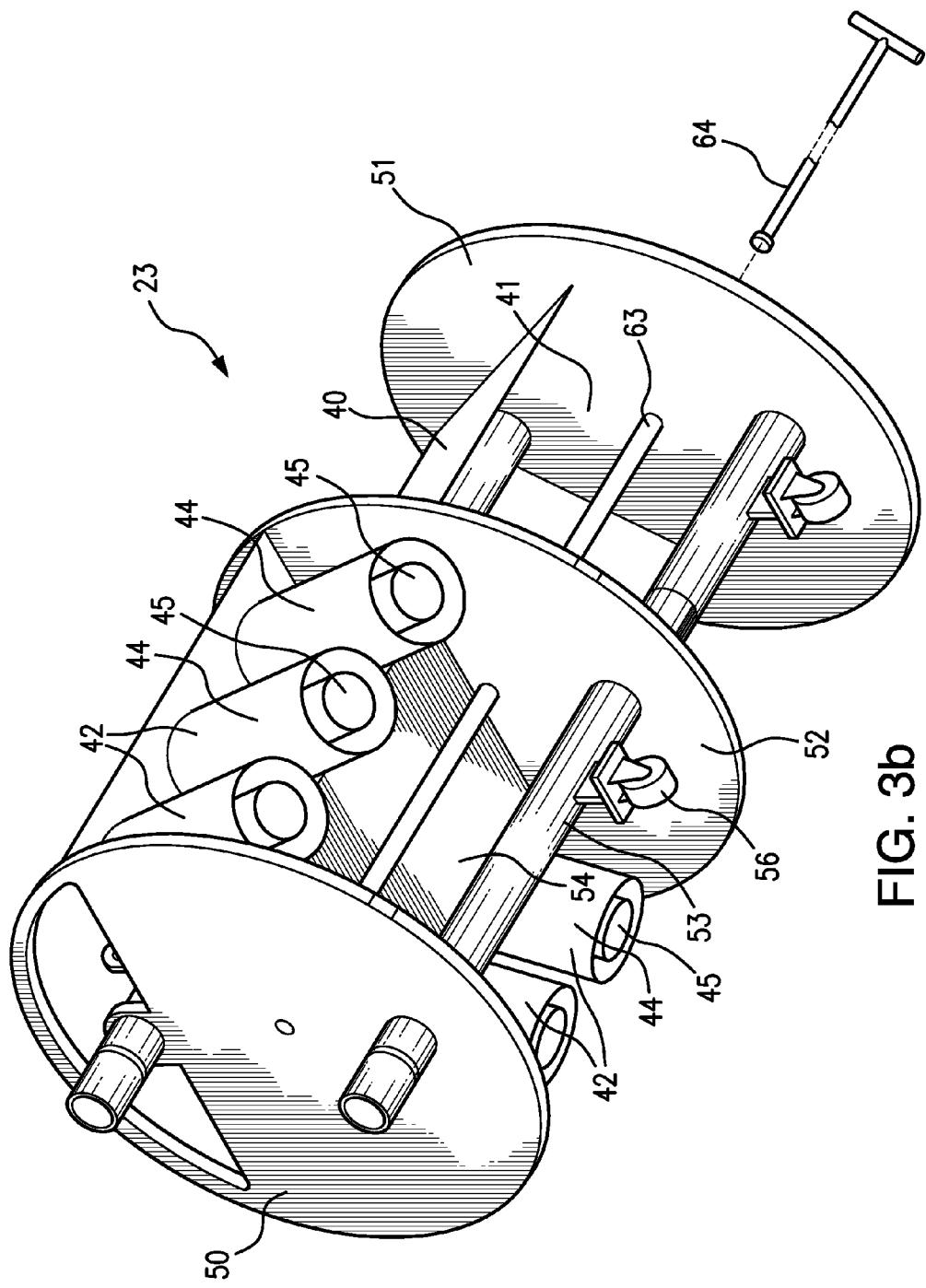
Figure 4:
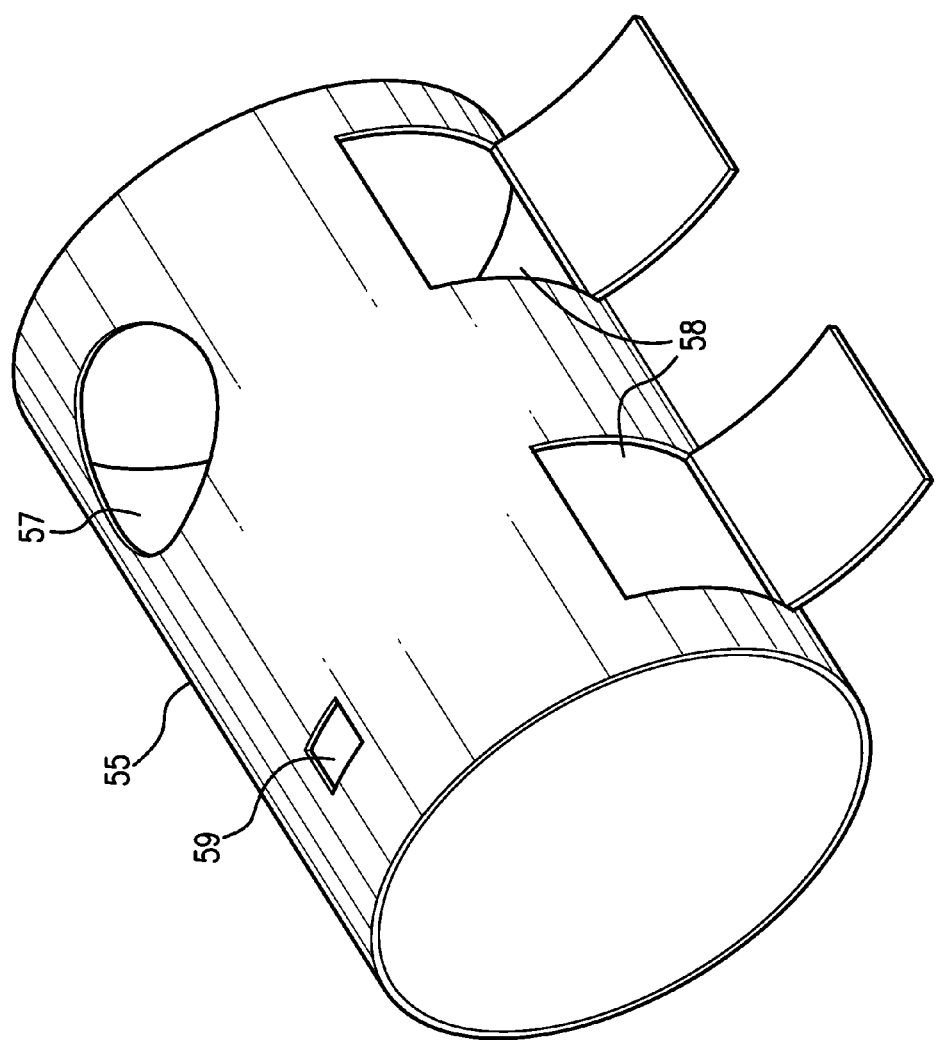
FIG. 4 is an oblique view of a casing for the separator assembly of FIG. 3.
Figure 5:
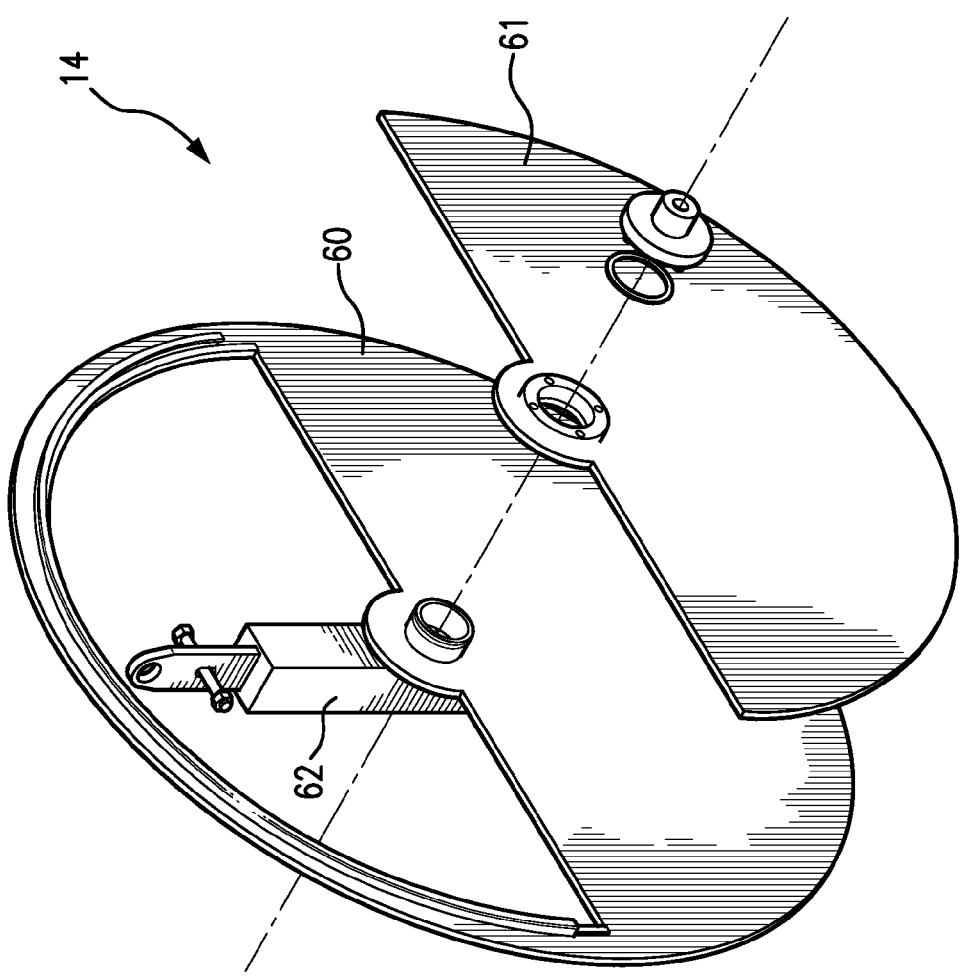
FIG. 5 is an exploded oblique view of an openable/closeable barrier.

The separator assembly may be configured in any of numerous ways and may include one or more separators, including, for example, one or more inertial separators. For many embodiments, the separator assembly may comprise a multistage separator assembly, and at least one stage may include any type of centrifugal or dynamic separator. One of many different examples of a separator assembly is the two-stage separator assembly 23 shown in FIG. 3 The first stage may include an impact separator, e.g., a downwardly angled impact plate 40, directly in the gas flow path from the gas inlet 15 and a large settling region 41 below the impact plate 40. The second stage may include one or more higher efficiency separators 42, e.g., a bank of cyclone separators 42 supported by a top plate 43. For some embodiments, the cyclone separators 42 may have a cut off of down to about 8 microns or less at rated gas flow and a cut off of down to about 10 microns or less at 50% of rated gas flow. Any number of cyclone separators may be provided, e.g., four or more, six or more, eight or more, or ten or more, and the cyclone separators may be variously configured. In the embodiment of FIG. 3, each cyclone separator 42 may include an outer can 44 mounted around an inner can 45. The outer can 44 may be closed at the inlet end, e.g., by the top plate 43, and open at the lower outlet end, and the inner can 45 may be open at both the inlet and outlet ends, the outlet end of the inner can opening through the top plate 43. The axes of the cyclone separators may be oriented parallel to, perpendicular to, or at any angle to the axis of the pressure vessel. In the illustrated embodiment, the axes are generally perpendicular to the axis of the pressure vessel 11. Additional traps may be arranged at and/or below the lower outlet of the outer can to enhance the retention of particulates.

The separator assembly may also include a frame supporting the multi-stage separators, and the frame may be configured in any of numerous ways. For example, the frame may comprise a plurality of support plates 50-52 connected by one or more struts 53 as well as the top plate 43 and the impact plate 40. A downstream support plate 50 may be positioned at the outlet end of the separator assembly 23, an upstream support plate 51 maybe positioned at the opposite end of the separator assembly 23, and an intermediate support plate 52 may be positioned between the upstream and downstream support plates 50, 51. Each support plate 50-52 may have a dimension, e.g., an outer diameter, that closely corresponds to the inner diameter of the pressure vessel 11, enabling the support plates 50-52 to fit closely against the pressure vessel 11 and inhibit bypass of any gas around the entire separator assembly 23 or any of the stages of the separator assembly 23. For some embodiments, one or more of the support plates 50-52 may be sealed to the pressure vessel 11. The first stage of the separator assembly 23 may be defined between the upstream support plate 51 and the intermediate support plate 52, while the second stage may be defined between the intermediate support plate 52 and the downstream support plate 50. An opening in the intermediate support plate 52 beneath the angled impact plate 40 may open into a duct 54 that extends below the top plate 43, allowing gas to flow from the first stage into the second stage. The duct 54 may feed the gas to each cyclone separator 42, for example, through an inlet opening in the side of the outer can 44 near the inlet end. An opening in the downstream support plate 50 above the top plate 43 allows gas to exit the second stage of the separator assembly 23 and enter the filter assembly 24.

The separator assembly may further include a shell mounted to all or one or more of the separators and/or stages of the separator assembly to contain the particulates removed by the separators 40, 42. In the illustrated embodiment, the shell 55 may be mounted to all of the separators 40, 42 and the frame of the separator assembly 23. The shell may be variously configured and may or may not be connected and/or sealed to the remainder of the separation assembly. For example, the shell 55 may be generally cylindrical and open on both ends and may surround one or more of the separators 40, 42. The shell 55 may be dimensioned to fit within the interior of the pressure vessel 11 and around the separators and support plates 50-52 of the separator assembly 23. For example, the shell 55 may be dimensioned to closely correspond to the inner diameter of the pressure vessel 11 and the outer diameter of the support plates 50-52, enabling the shell 55 to inhibit bypass of any gas between the pressure vessel 11 and the shell 55 or between the shell 55 and the support plates 50-52. For many embodiments, the shell 55 may be sealed to the support plates 50-52 in any suitable manner, e.g., permanently or releasably, to contain any particulates removed from the gas by the separators 40, 42 of the separator assembly 23. For example, the shell 55 may be welded to the outer rims of the separator plates 50-52 and may form a liquid-tight container containing the solids and liquids removed from the gas by the separator assembly 23. The shell 55 may have a significant liquid and/or solids holding capacity which allows all of the particulates removed by the separator assembly 23 over an extended period, even after scraping operations, to be conveniently and safely stored within the shell 55. The shell may have one or more openings. For example, the shell 55 may include an inlet opening 57 in the side, e.g., at the top, of the shell 55 that fluidly communicates with the gas inlet 15 in the pressure vessel 11, allowing gas to flow through the gas inlet 15 into the first stage of the separator assembly 23. The inlet opening 57 in the shell 55 may fit closely against the gas inlet 15 and/or may be sealed to the gas inlet 15 to prevent bypass of gas around the separator assembly 23. Other openings in the shell 55 may include sealable side openings 58 that facilitate emptying and cleaning of the interior of the shell 55 and another top opening 59 that allows the shell to be filled with water and/or any other suitable inhibitor. For many embodiments, the shell 55 need not be a pressure vessel capable of withstanding the difference in pressure between the interior and the exterior of the pressure vessel 11. Instead, the shell 55 may be formed from a much lighter gauge material, e.g., a lighter gauge metal, that can contain solids and liquids removed by the separator assembly 23.

The separator assembly may further include one or more additional components. For example, the separator assembly may include a transit mechanism facilitating removal and insertion of the separator assembly within the pressure vessel or the shell. The transit mechanism may be configured in any of numerous ways, including, for example, as slides on the frame or the shell of the filter assembly and/or rails along the pressure vessel. In the illustrated embodiment, the transit mechanism may comprise a plurality of wheels 56. The transit mechanism, e.g., the wheels, may be distributed around the frame of the separator assembly and may be arranged to move, e.g., roll, along the inner periphery of the shell 55 in a manner similar to the filter assembly wheels 36. For example, outside of the pressure vessel 11 the separators 40, 42 and the frame of the separator assembly 23 may be moved, e.g., rolled, along the interior of the shell 55 and permanently or removably fixed in place in the shell 55, for example, by welding the support plates 50-52 to the shell 55. Then the entire separator assembly 23 including the shell 55 may be moved through the open hatch 20 of the pressure vessel and fixed in place in any suitable manner with the gas inlet 15 of the pressure vessel 11 fluidly communicating with the inlet opening 57 in the shell 55. The shell may further include a transit mechanism, e.g., wheels, to facilitate this movement along the pressure vessel, or the shell with the remainder of the separator assembly inside may be guided along the pressure vessel, for example, by a push/pull table similar to the push/pull tables used for scrapers. Alternatively, the shell may first be installed in the pressure vessel without the remainder of the separator assembly. The remainder of the separator assembly, e.g., the separators and the frame, may then be moved, e.g., rolled, along the interior of the shell and fixed in place while the shell is in the pressure vessel.

The purification arrangement may include one or more additional components. For example, for some, but not all embodiments, the purification arrangement 10 may include an openable/closable barrier 14 positioned in the interior of the pressure vessel 11 between the first and second purification assemblies 12, 13. The openable/closeable barrier may be configured in a variety of ways to alternately provide fluid communication between the purification assemblies, e.g., the filter assembly and the separator assembly, and fluidly isolate the purification assemblies. For example, the barrier 14 may comprise a pair of coaxially mounted plates 60, 61, at least one of the plates 61 being rotatable. For many embodiments, one plate 60 may be stationary and the other plate 61 may be rotatable. The plates 60, 61 may have a shape that generally conforms to the cross-sectional shape of the interior of the pressure vessel 11 and a dimension, e.g., an outer diameter, that closely corresponds to the inner diameter of the pressure vessel 11, providing a close fit between the outer edge of the plates 60, 61 and the interior of the pressure vessel 11 to inhibit gas flow when the barrier 14 is closed. The plates 60, 61 may extend generally perpendicular to the axis of the pressure vessel 11 and may or may not be sealed to the pressure vessel 11. Each plate 60, 61 may have one or more apertures extending around a significant portion, e.g., about 50% or less, of the circumference of the plate 60, 61, the remainder of the plate 60, 61 being imperforate. Alternatively, one of the plates 60, 61, e.g., the rotatable plate 61, may be a partial plate having only an imperforate portion large enough to obstruct the aperture on the other plate 60 in the closed position. The barrier 14 may be movable between an open position and a closed position. For example, at least one of the plates 61 may rotate with respect to the other plate 60 between the open position and the closed position. In the open position, the aperture(s) of the plates 60, 61 are aligned and unobstructed, the barrier 14 is open, and gas may flow through the open barrier 14 between the purification assemblies 12, 13. For many embodiments, the imperforate portion of the rotatable plate(s) may be oriented gravitationally below the aperture(s). The greater weight of the imperforate portion may "lock" the barrier in the open position during normal operation when gas flows between the purification assemblies. Alternatively or additionally, the plates may be locked in the open position by a locking mechanism (not shown). In the closed position, the imperforate portions of the plates 60, 61 obstruct the apertures of the plates 60, 61, the barrier 14 is closed, and the purification assemblies 12, 13 are fluidly isolated from one another. The plates 60, 61 may be sealed to one another or may be positioned sufficiently close to one another to substantially inhibit gas flow through the obstructed apertures of the closed barrier.

The barrier 14 may be mounted in the gas flow path between the purification assemblies in a wide variety of ways. For example, the barrier 14 may include a mount 62 for supporting the barrier 14 in the gas flow path between the first and second purification assemblies 12, 13. The mount 62 may be variously configured and the plates 60, 61 may be supported by the mount 62 in a variety of ways, e.g., rotatably supported. The mount may be attached to a variety of structures to support the barrier in the interior of the pressure vessel. For some embodiments, the mount may be attached to the pressure vessel itself. For example, the mount may be attached, e.g., removably attached, to the interior of the pressure vessel, supporting the barrier between the filter assembly and the separator assembly. For other embodiments, the mount may be attached to the separator assembly. For example, the mount may be attached to the struts or the downstream support plate of the frame or to the shell of the separator assembly, supporting the bag firer just beyond and downstream of the separator assembly. For still other embodiments, the mount may be attached directly to the filter assembly 24. For example, the mount 62 may be attached to the frame 30 of the filter assembly 24, e.g., the support plate 32 and/or the struts 33, supporting the barrier 14 just behind and upstream of the filter assembly 24.

Methods for removing particulates from a gas flowing in a gas pipeline system may be embodied in a wide variety of ways. For example, during normal operation a flow of gas may be established through the pipeline system and through the pressure vessel 11 connected to the pipeline. As the gas flows along the gas flow path through the interior of the pressure vessel 11, the gas is directed through the gas inlet 15, the first purification assembly 12, and the second purification assembly 13 before exiting the pressure vessel 11 via the gas outlet 16. For embodiments having a barrier 14, the gas may also be directed through the open barrier 14 between the purification assemblies 12, 13. As the gas flows through the purification assemblies 12, 13, a significant portion of the particulates, both liquid and solids, is removed from the gas by the purification assemblies 12, 13. A wide variety of different purification assemblies may be contained in the pressure vessel to remove particulates from the gas, as previously explained. One of numerous examples of different combinations of purification assemblies is shown in FIG. 1, where the first purification assembly 12 may comprise a separator assembly 24 for removing liquid and larger solids particulates and the second purification assembly 13 may comprise a filter assembly 24 for removing finer solids particulates. This arrangement of a separator assembly 23 upstream and a filter assembly 24 downstream in the pressure vessel 11 is particularly effective for removing black powder from the gas.

As shown in FIG. 1, gas may enter the pressure vessel 11 and pass along the gas flow path first through the separator assembly 23 and then through the filter assembly 24. As the gas passes through the separator assembly 23, it may be first directed through the first stage of the separator assembly to remove liquid and larger solids particulates and then through the second stage to remove additional liquid and finer solid particulates. For example, gas may pass from the gas inlet 15 directly to the first stage, impinging against an impact separator, e.g., the angled impact plate 40. Liquid particulates may coalesce along the impact plate 40 and then flow to the bottom of the first stage. The larger solids particulates may be deflected by the impact plate 40 to the side and then fall to the bottom of the first stage. After moving quickly past the edges of the angled impact plate 40, the gas may slow in the larger settling region 41 below the angled impact plate 41, allowing additional particulates to settle to the bottom of the first stage. As the particulates are removed by the separator(s) of the first stage, the shell may collect and contain the removed particulates. For example, the particulates removed in the first stage may be contained between the upstream support plate 51 and the intermediate support plate 52 by the shell 55, thereby isolating the particulates from the pressure vessel 11.

The gas may then enter the second stage from the settling region 41 of the first stage, for example, passing through an aperture located closely under the apex of the angled impact plate 40 and into the duct 54 of the second stage. From the duct 54, the gas may enter a cyclone separator 42, for example, through an inlet opening in the side of each outer can 44, where the gas and remaining liquid and solids particulates are swirled within the outer can 44 toward the outlet end of the can 44. Liquid and solids particulates are deflected from the principal gas flow stream by the cyclonic movement of the gas in the outer can 44 and fall to the bottom of the second stage through the outlet end of the outer can 44. Additional traps (not shown) beneath the outer cans may enhance the retention of liquid and solid particulates between the intermediate and downstream support plates 52, 50. The gas may pass from the outlet end of the outer can 44 and into the inlet end of the inner can 45, where it may pass along the inner can 45 and through the outlet end of the inner can 45 into the space above the top plate 43. From the space above the top plate 43, the gas, substantially depleted in particulates, may exit the separation assembly 23, for example, through the opening in the downstream support plate 50 above the top plate 43. Again, as the particulates are removed by the separators of the second stage, the shell may collect and contain the removed particulates. For example, the particulates removed in the second stage may be contained between the intermediate support plate 52 and the downstream support plate 50 by the shell 55, isolating the particulates from the pressure vessel 11.

From the first purification assembly 12, e.g., the separator assembly 23, the gas may flow along the gas flow path to the second purification assembly 13, e.g., the filter assembly 24. For embodiments having an openable/closeable barrier 14, the gas may flow between the purification assemblies 12, 13, e.g., the separator and filter assemblies 23, 24, through an open barrier 14. For example, the gas may flow through the aligned apertures in the plates 60, 61 of the open barrier 14 between the separator assembly 23 and the filter assembly 24 with little or no pressure drop. For embodiments without an openable/closable barrier, the gas may flow directly to the second purification assembly.

From the first purification assembly 12, the gas may pass along the gas flow path through the filter assembly 24, where any finer particulates remaining in the gas may be removed by the filter medium 26. For example, for embodiments arranged fix outside-in flow through the filter elements 25, the gas may flow into the unfiltered region along the exterior of the filter elements 25. The gas then passes outside-in through the porous filter medium 26 of each filter element 25, where the finer particulates are removed by the filter medium 26, and into the interior of the hollow filter element 25. From the interiors of the filter elements 25, the filtered gas may pass to the gas outlet 16 of the pressure vessel 11 substantially free of liquid and solids particulates. For example, the gas may pass along the interiors of the filter elements 25 through the apertures in the tube sheet 31 into the header 34 and through the header 34 to the gas outlet 16.

After an extended period of time, one or both of the purification assemblies 12, 13, e.g., the separator assembly 23 and/or the filter assembly 24, may become loaded with particulates. Various sensors, e.g., pressure sensors and/or weight sensors, associated with the purification assemblies 12, 13 may provide an indication that a design parameter, e.g., the pressure drop across or the particulate weight within the purification assembly, has been exceeded. Gas flow through the pressure vessel 11 may then be terminated. For example, the pipeline system may be shut down or the purification arrangement 10 may be bypassed or taken off line in favor of a parallel purification arrangement 10. Upon termination of the gas flow one or both of the purification assemblies 12, 13 as well as the pressure vessel 11 may be serviced, e.g., cleaned and/or replaced.

The shell 55 of the separator assembly 23 greatly facilitates servicing of the purification arrangement 10. Many particulates, including black powder, may be toxic and/or may be chemically reactive, e.g., pyrophoric, when exposed to air and, therefore, present a serious safety hazard to the service personnel. The shell 55 collects and contains the particulates removed by the separators 40, 42 and isolates the service personnel from many of the hazards of these particulates. For example, in the illustrated embodiment, the pressure vessel 11 may be opened, e.g., by swinging the hatch 20 open, and the separator assembly 23 may be removed through the open hatch 20. The separator assembly 23, including the shell 55, may be removed from the pressure vessel 11, for example, via a transit mechanism and/or a push/pull table, with all of the collected liquid and solid particulates contained within the shell 55 and isolated from the service personnel. To even further ensure the safety of the service personnel, the shell may be filled with water and/or any other suitable inhibitor. For example, water may dilute the liquid contaminants and prevent any solid contaminants from reacting with air. The water may be supplied to the shell 55 through a water inlet in the pressure vessel 11 and the top opening 59 in the shell 55 before the separator assembly 23 is removed.

In addition to protecting the service personnel, the shell 55 of the separator assembly 23 greatly reduces the downtime required for removing a separator assembly 23 fully loaded with particulates and replacing it with a cleaned/new separator assembly 23 empty of particulates. Not only does the shell 55 isolate the particulates from the service personnel, it also isolates the particulates from the pressure vessel 11. When the loaded separator assembly 23 with all of the removed particulates contained within the shell 55 is removed, the pressure vessel remains relatively clean, requiring far less time to clean the interior of the pressure vessel 11 in the vicinity of the removed separator assembly 23 and install the cleaned/new separator assembly 23.

For embodiments having an openable/closeable barrier, service personnel may be further protected by the openable/closeable barrier 14. For example, after the gas flow is terminated, the open barrier may be closed, isolating the purification assemblies from one another and allowing at least one of the purification assemblies e.g., the separator assembly 23, to be serviced without exposing the service personnel to the particulates in the other purification assembly, e.g., the filter assembly 24. For example, the hatch 20 of the pressure vessel 11 may be opened and the open barrier 14 may be moved to the closed position in any of a variety of ways. For example, one of the purification assemblies, e.g., the separator assembly 23, may have a hollow guide 63 which extends through the purification assembly 11 and allows a tool 64, e.g., an elongate T-bar, to be coupled to the open barrier 14 to move it to the closed position. For some embodiments, the tool 64 may have a fitting on one end that engages the rotatable plate 61 of the barrier 14 and rotates the plate 61 until the imperforate portions of the plates 61, 62 obstruct the apertures in the plates 61, 62, closing the barrier 14. The closed barrier 14 defines first and second isolated chambers 65, 66 within the pressure vessel 11 around the first and second purification assemblies 12, 13 respectively, allowing the service personnel to service one of the purification assemblies 12, 13 free of the risks from the particulates in the other purification assembly 13, 12.

For many embodiments, the service personnel may be even further protected by flooding one or both of the first and second chambers 65, 66 with an inert gas, e.g., nitrogen. For some embodiments, before the hatch 20 is opened, the entire pressure vessel 11 or at least the second chamber 66 may be flooded with the inert gas via an inert gas inlet in the pressure vessel 11. The hatch 20 may then be opened and the barrier 14 may be moved to the closed position, maintaining the inert gas in the second chamber 66 around the filter elements 25 of the filter assembly 24. Additionally, a small flow of inert gas may be directed into the second chamber 66 to maintain a small positive pressure of inert gas in the second chamber 66 while barrier 14 is closed and the first purification assembly 12, e.g., the separator assembly 23, is removed and/or serviced. Maintaining the inert gas around the second purification assembly 13, e.g., the filter assembly 24, ensures that the fine particulates removed by the filter assembly 24 are not exposed to air and subject to the possibility of a pyrophoric reaction.

If the second purification assembly 13 is not in need of servicing, a cleaned/new first purification assembly 12, e.g., a separator assembly 23, may be installed through the open hatch 20 in the pressure vessel 11, e.g., via a transit mechanism and/or push/pull table. For embodiments having an openable/closeable barrier 14, the closed barrier 14 may be opened, either before or after the cleaned or new first purification assembly is installed. For example, a cleaned/new separator assembly 23 including a shell 55 may be installed in the pressure vessel 11. The T-bar 65 may be inserted through the guide 63 and engaged with the rotatable plate 61, and the plate 61 may be rotated until the apertures in the plates 60, 61 are aligned, opening the barrier 14 for normal operation. The cover, e.g., the hatch 20, may be closed and gas flow may again be established through the purification arrangement 10.

If the second purification assembly 13 is also in need of servicing, it too may be removed from the pressure vessel 11. For some embodiments, the pressure vessel may include a separate opening, e.g., a separate hatch or cover, for removing the second purification assembly allowing the second purification assembly to be removed before or at the same time as the first purification assembly. In the illustrated embodiment, the second purification assembly 13, e.g., the filter assembly 24, may be removed from the pressure vessel 11 after the first purification assembly 12, e.g., the separator assembly 23, through the same opening, e.g., the hatch 20, as the first purification assembly 12. For embodiments in which an openable/closeable barrier is attached directly to the pressure vessel, the barrier and/or the barrier mount may be removed from the pressure vessel before the second purification assembly follows the first purification through the hatch. For embodiments in which the barrier 14 is attached to the first or second purification assembly 12, 13 or no battier is provided, the second purification assembly 13 may be removed from the pressure vessel 11 for cleaning or replacement in a variety of ways, as previously described with respect to the first purification assembly 12. In the illustrated embodiment, the filter assembly 24 may be disengaged from the gas outlet 16 of the pressure vessel 11, for example, by disengaging the header 34 from the gas outlet 16. For embodiments with a transit mechanism, e.g., the wheels 36, the filter assembly 24 may be quickly and easily rolled along the pressure vessel 11 through the open hatch 20. The barrier 14 may be removed from the pressure vessel 11, for example, along with the filter assembly 24. The individual filter elements 25 may be cleaned or replaced. Alternatively, an entirely new filter assembly 24, including new filter elements 25, with or without a barrier 14, may replace the spent filter assembly 24.

Once the pressure vessel 11 is empty, it may be cleaned and a cleaned/new second purification assembly 13 may be installed in the pressure vessel 11. For example, the cleaned/new filter assembly 24, with or without an attached barrier 14, may be moved into the pressure vessel 11 through the open axial end and along the pressure vessel 11 and fitted into sealed engagement with the gas outlet 16 at the opposite end of the pressure vessel 11. For embodiments with a transit mechanism, e.g., the wheels 36, the filter assembly 24 may be quickly and easily rolled toward the gas outlet 16 until the header 34 engages and is sealed to the gas inlet 16.

Before or after the cleaned/new second purification assembly 13, e.g., the filter assembly 24, is installed, any barrier 14 may be moved to the open position. The cleaned/new first purification assembly 12, e.g., the separator assembly 23, may then be installed as previously described. The cover, e.g., the hatch 20 may be closed. And a gas flow may again be established through the purification arrangement 10.

Although the invention has been disclosed in the embodiments previously described and illustrated, the invention is not limited to those embodiments. For instance, one or more features of an embodiment may be eliminated or modified, one or more features of one embodiment may be combined with one or more features of other embodiments, or embodiments with very different features may be envisioned without departing from the scope of the invention. For example, for some embodiments the openable/closeable barrier may comprise a single plate including one section hinged to another section. The hinged section may be moved between a closed position and an open position. In the closed position, the two sections of the plate may be co-planar and the plate may have a shape that closely fits across the cross section of the pressure vessel, inhibiting gas flow and isolating the first and second purification assemblies. In the open section, the hinged sections may extend at an angle to one another, creating an aperture through which gas may flow between the first and second purification assemblies. A tool similar to the T-bar may be used to open and close the hinged barrier. For some embodiments, the barrier may comprise a shuttered or louvered plate. The shutter(s) or louver(s) may be moved to an open or closed position in a variety of ways, including for example, as previously described with respect to the T-bar. Alternatively, the shutter(s) or louver(s) may be biased toward a closed position, e.g., by springs, but forced to the open position when the first purification assembly is inserted in the pressure vessel. For example, a member on the first purification assembly may contact the barrier and force the shutter(s) or louver(s) open when the first purification assembly is properly positioned in the pressure vessel.

For some embodiments, the array of filter elements may be arranged for gas flow inside-out. The tube sheet may be positioned at the end of the array closest to the barrier and may be sealed to the pressure vessel or to a housing surrounding the array of filter elements. The open ends of the filter elements may be sealed to the apertures in the tube sheet, while the support plate may be located at or near the opposite end of the array. Gas flowing through the open barrier may pass into the interiors of the hollow filter elements through the apertures in the tube sheet and then pass inside-out through the filter medium, where the finer particulates are removed, to the exterior of the filter elements. From the exterior of the filter elements, the gas may pass to the gas outlet of the pressure vessel.

The present invention thus encompasses innumerable embodiments and is not restricted to the particular embodiments that have been described, illustrated, and/or suggested herein. Rather, the present invention includes all embodiments and modifications that may fall within the scope of the claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A purification arrangement for a gas pipeline system, the purification arrangement comprising:
    a pressure vessel including an interior, a gas inlet, and a gas outlet and defining a gas flow path through the interior of the pressure vessel between the gas inlet and the gas outlet, wherein the pressure vessel includes an openable cover;
    a first purification assembly located in the pressure vessel in the gas flow path between the gas inlet and the gas outlet;
    a second purification assembly located in the pressure vessel in the gas flow path between the gas inlet and the gas outlet, the second purification assembly being located in the gas flow path between the gas outlet and the first purification assembly,
    wherein at least one of the first and second purification assemblies includes a separator assembly having one or more separators for removing particulates from the gas and a shell mounted to the one or more separators to contain the particulates removed by the one or more separators, and wherein the separator assembly including the shell is removable from the pressure vessel via the openable cover.

2. The purification arrangement of claim 1 wherein the first purification assembly comprises the separator assembly.

3. The purification arrangement of claim 1 wherein the separator assembly includes one or more cyclone separators.

4. The purification arrangement of claim 1 wherein the separator assembly includes a plurality of stages positioned in the gas flow path, wherein at least one of the stages includes one or more cyclone separators.

5. The purification arrangement of claim 4 wherein the shell surrounds all stages of the separator assembly.

6. The purification arrangement of claim 1 wherein at least one of the first and second purification assemblies comprises a filter assembly having a porous filter medium for filtering particulates from the gas.

7. The purification arrangement of claim 6 wherein the filter assembly comprises an array of hollow, cylindrical filter elements.

8. The purification arrangement of claim 1 further comprising an openable/closable barrier positioned in the interior of the pressure vessel between the first and second purification assemblies, the barrier being moveable between an open position wherein the first purification assembly fluidly communicates with the second purification assembly and a closed position wherein the barrier isolates the first and second purification assemblies from one another.

9. A purification arrangement for a gas pipeline system, the purification arrangement comprising:
a pressure vessel including an interior, a gas inlet, and a gas outlet and defining a gas flow path through the interior of the pressure vessel between the gas inlet and the gas outlet, wherein the pressure vessel includes an openable cover;
a filter assembly located in the gas flow path in the interior of the pressure vessel, wherein the filter assembly includes a plurality of filter elements, each element including a filter medium for filtering particulates from gas flowing through the filter element; and
a separator assembly located in the gas flow path in the interior of the pressure vessel between the gas inlet of the pressure vessel and the filter assembly, wherein the separator assembly comprises one or more separators for removing particulates from the gas and a shell mounted to the one or more separators to contain the particulates removed by the one or more separators, and wherein the separator assembly including the shell is removable from the pressure vessel via the openable cover.

10. The purification arrangement of claim 9 wherein the separator assembly includes one or more cyclone separators.

11. The purification arrangement of claim 9 wherein the separator assembly comprises at least a first stage and a second stage downstream from the first stage in the gas flow path, the second stage including cyclone separators.

12. The purification arrangement of claim 11 wherein the shell surrounds both the first and second stages and collects particulates removed by the first and second stages.

13. The purification arrangement of claim 9 wherein the shell defines a liquid-tight enclosure.

14. The purification arrangement of claim 9 wherein each filter element has a hollow, cylindrical configuration and the plurality of filter elements are arranged for outside-in flow.

15. The purification assembly of claim 9 further comprising an openable/closable barrier positioned in the interior of the pressure vessel between the filter assembly and the separator assembly, the barrier being moveable between an open position wherein the filter assembly fluidly communicates with the separator assembly and a closed position wherein the barrier isolates the filter assembly and the separator assembly from one another.

16. A method for removing particulates from a gas flowing in a gas pipeline system, the method comprising:
establishing a flow of gas through a pressure vessel from a gas inlet to a gas outlet, including directing gas through a first purification assembly and a second purification assembly, wherein directing gas through the first purification and second purification assemblies includes directing gas through one or more separators for removing particulates from the gas and containing the particulates removed by the one or more separators in a shell mounted around the separators;
terminating the flow of gas through the pressure vessel; and
servicing at least one of the first and second purification assemblies, including opening an openable cover of the pressure vessel and removing from the pressure vessel the one or more separators and the shell containing the particulates removed by the one or more separators via the openable cover.

17. The method of claim 16 further comprising filling the shell with water after terminating the flow of gas through the pressure vessel.

18. The method of claim 16 wherein directing gas through the first purification assembly comprises directing the gas through the separator assembly and wherein directing gas through the second purification assembly comprises directing gas through a filter assembly downstream from the separator assembly.

19. The method of claim 16 wherein establishing the flow of gas includes directing gas through an open barrier positioned between first and second purification assemblies, the method further comprising closing the barrier to fluidly isolate the first and second purification assemblies after the flow of gas has been terminated.

20. The method of claim 16 further comprising reestablishing a gas flow through the pressure vessel after servicing at least one of the first and second purification assemblies.

21. The purification arrangement of claim 4 wherein the separator assembly includes support plates separating the stages and wherein the shell is mounted around the support plates to inhibit gas flow between the shell and the support plates.

22. The purification arrangement of claim 1 wherein the openable cover comprises an openable hatch at an axial end of the pressure vessel.

23. The purification arrangement of claim 11 wherein the separator assembly includes support plates separating the stages and wherein the shell is mounted around the support plates to inhibit gas flow between the shell and the support plates.

* * * * *